United States Patent [19]

Nickerson, III

[11] 4,009,892

[45] Mar. 1, 1977

[54] METHOD AND PRODUCT FOR PREVENTING FRAUD IN DOCUMENT IDENTIFICATION

[76] Inventor: Eugene W. Nickerson, III, 19 Colvin Road, Scarsdale, N.Y. 10583

[22] Filed: Feb. 3, 1975

[21] Appl. No.: 546,595

[52] U.S. Cl. .................................... 283/6; 283/58; 106/21

[51] Int. Cl.² .................... B42D 15/00; C09D 11/00

[58] Field of Search ...................... 283/6, 8, 57, 58; 427/7, 117, 146, 150, 157; 428/306; 106/21

[56] References Cited

UNITED STATES PATENTS

| | | | |
|---|---|---|---|
| 193,221 | 7/1877 | Brooks | 283/58 X |
| 1,307,560 | 6/1919 | McQueeny | 283/6 X |
| 2,374,723 | 5/1945 | Barghansen | 283/6 X |
| 2,822,288 | 2/1958 | Harvey et al. | 283/6 X |
| 3,829,133 | 8/1974 | Romonoff | 283/6 |
| 3,833,395 | 9/1974 | Gosnell | 283/6 X |
| 3,886,084 | 5/1975 | Vassiliadgs | 106/21 X |
| 3,896,965 | 7/1975 | Cornell | 283/8 B X |

OTHER PUBLICATIONS

IBM Technical Disclosure Bulletin vol. 17 No. 7 T. F. Herron 12–74.

*Primary Examiner*—Lawrence Charles
*Attorney, Agent, or Firm*—Wood, Herron & Evans

[57] ABSTRACT

A bank check includes a secret alphanumeric code designation known only to the correct payee which is covered with a light-impervious cover having a light-sensitive material micro-encapsulated in the surface adjacent to the surface of the bank check. The light-sensitive material is released in a predetermined pattern by pressure exerted against the combination of the cover and the check so that whenever the cover is removed, the light-sensitive material is exposed and the pattern becomes visible to thereby make premature removal detectible.

13 Claims, 1 Drawing Figure

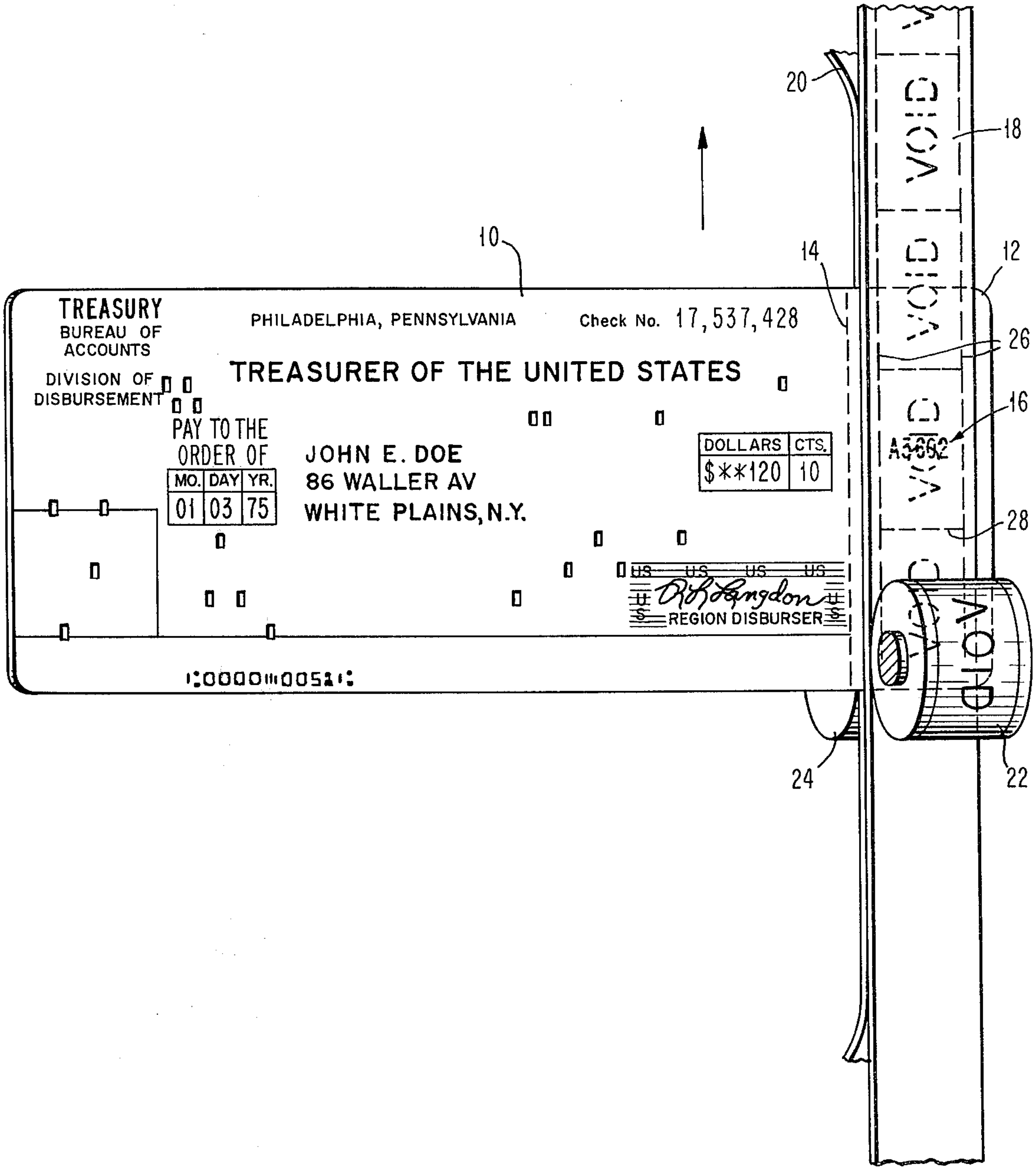
TREASURY
BUREAU OF
ACCOUNTS
DIVISION OF
DISBURSEMENT
PHILADELPHIA, PENNSYLVANIA
Check No. 17,537,428
TREASURER OF THE UNITED STATES
PAY TO THE
ORDER OF
JOHN E. DOE
86 WALLER AV
WHITE PLAINS, N.Y.
MO. DAY YR.
01 03 75
DOLLARS CTS.
$**120 10
REGION DISBURSER
VOID
A3662
10
12
14
16
18
20
22
24
26
28

METHOD AND PRODUCT FOR PREVENTING FRAUD IN DOCUMENT IDENTIFICATION

This invention relates to the identification of documents, and the invention is particularly useful for associating the true owner with the document such as is required for instance if the document is a payment order such as a bank check which is to be cashed only by the true owner.

The problem of theft of payment order documents such as welfare checks and social security checks has become extremely difficult and costly. The problem is especially difficult in large cities where bank tellers are less likely to know the true identity of their customers. Serious losses are incurred every year because of this hazard.

Various proposals have been made in the past for attempting to overcome this problem. Several of these proposals are illustrated for instance in U.S. Pat. No. 2,374,723 issued to L. R. Barghausen on May 1, 1945, and in U.S. Pat. No. 3,829,133 issued to Edward A. Smagala-Romanoff on Aug. 13, 1974. The Barghausen patent discloses the use of a secret number which is revealed by removing a portion of the top ply of a multiple ply payment document. The Smagala-Romanoff patent discloses the use of a secret number which is concealed under a coating on the document which can be removed by scraping with an instrument such as a coin. These prior systems both present serious disadvantages of high cost, and lack of compatability with machine-readable punched card payment documents such as are commonly used for high volume payments such as welfare checks, social security checks, and corporate dividend and payroll checks.

Accordingly, it is an important object of the present invention to provide a new method and product for preventing fraud in document identification which is substantially improved in effectiveness at a moderate cost.

Another important object of the present invention is to provide an effective method and product for preventing fraud in payment document identification which is substantially more economical than prior methods and products.

Another important object of the present invention is to provide an improved method and product for prevention of fraud in document identification which is readily adaptable to machine-readable documents, and particularly to punched card machine-readable documents without interfering with machine processing.

These and other objects of the invention will be apparent from the following description and the accompanying drawings.

In carrying out the invention there is provided a method for protecting a payment order against collection by unauthorized persons comprising the steps of placing on a portion of said payment order a secret alphanumeric code designation known only to the correct payee, covering said secret code designation with a light impervious cover having a light-sensitive material micro-encapsulated in the surface thereof adjacent to the surface of said payment order, and exerting pressure in a pattern on the combination of said cover and said payment order to cause the micro-encapsulated light-sensitive material to be released from said cover and to be adhered to the adjacent surface of said payment order in the localized areas of the pattern of pressure so that whenever said cover is removed to expose said light-sensitive material said pattern of pressure soon becomes visible to thereby make premature removal detectable.

In the accompanying drawing, there is disclosed a typical document in accordance with the present invention and illustrating schematically a preferred mode of carrying out the invention.

Referring more particularly to the drawing, the document may preferably consist of a machine-readable punched-card 10 which is in the form of a bank check. The card 10 preferably includes an end stub portion 12 which ultimately may be detached from the remainder of the document by reason of perforations as indicated at 14. This format is the same as that of a machine-readable card form which is presently commonly employed by the U.S. Department of the Treasury for use by employers for federal tax deposit of income and FICA taxes withheld from employees. Accordingly, while the removal of the end stub portion 12 reduces the length of the document, the reduced length document is nevertheless capable of being processed by existing punched-card reading machinery such as that used for the above-mentioned withholding tax transmittal forms.

A secret alphanumeric code designation which is known only to the correct payee is printed on the end stub portion 12 of the document, as indicated for instance at 16. As used in this specification, the term "alphanumeric" is meant to designate generically one or more alphabetical characters, or numerical characters, or a combination of alphabetic and numeric characters. The secret alphanumeric designation 16 may be printed on the payment document stub 12 by the same computer which prints up the payment document itself, but the information about the secret alphanumeric code designation obviously must not appear on the exposed main portion of the document 10, either in print, or in punched code form.

After the document is printed, the document 10 together with all of the other similar documents printed by the computer are run through a conveyer, not shown, which applies a cover means consisting of a front face cover strip 18 and a rear face cover strip 20 to the two faces of the end stub portion 12, thus covering and obscuring the alphanumeric code designation 16. The covering strips 18 and 20 may preferably consist of sheets of a polymeric organic resin material such as polyvinyl chloride or polyethylene which is formulated with a filler or pigment which makes the material substantially opaque to visible and ultra-violet light. Thus, while the alphanumeric code designation 16 is shown as visible in the drawing, it is actually intended to be completely concealed by the cover 18.

The cover strips 18 and 20 are caused to be attached adherently to the two sides of the stub portion 12 by means of pressure rollers 22 and 24 schematically shown above and below the strips which squeeze the strips against the surfaces of the end stub portion with considerable pressure. The strips 18 and 20 are caused to adhere to the end stub portion 12 by an embossing or crimping action alone, or in combination with an adhesive. The rollers 22 and 24 may also be heated to provide for adherence of the strips by heat sealing. The adherence is especially effective at the edge portions, as indicated at 26, and at periodically spaced cross portions indicated at 28. The rollers 22 and 24 are provided with suitable raised or irregular embossing surfaces corresponding to the adherent portions 26 and 28 of the cover strips to create the adherence at those positions. After the strips 18 and 20 are applied, they are trimmed off at the ends of the stub portion 12.

The inner surface of the cover strip 18, that is, the surface which is in contact with the front face surfaces of the end stub portion 12, includes a light-sensitive material, such as a silver halide material, which is micro-encapsulated in the cover strip surface. The micro-encapsulation surface structure is very similar to the well-known paper product for making copies without carbons which is sometimes referred to as "no carbon required". It is characteristic of this product that the micro-encapsulated material is released and marks the surface against which it is placed it an impact or pressure is applied on the top of the sheet containing the micro-encapsulated material. Thus, a typewriter will release the micro-encapsulated material and cause the image of the type to become visible in the usual no carbon required product.

A similar action is available in the present invention. Thus, wherever pressure is applied by the roller 22 to the upper surface of the cover strip 18, micro-encapsulated light-sensitive material is released from the under surface of the cover strip 18 and caused to adhere to the front face of the stub portion 12. As illustrated in the drawing, the roller 22 includes die-cut lettering which causes release of the photo-sensitive material in a pattern which represents the word VOID on the stub. However, the light-sensitive material which is adhered to the front face of the stub remains undeveloped and invisible as long as the strips 18 and 20 remain in place, effectively masking the face of the stub from illumination.

In use, the correct owner of the payment document carries it to the bank and informs the teller of the correct secret number 16 which is to be found beneath the cover 18 on the stub 12, preferably by writing that secret number on the exposed main body of the check 10. The teller then removes the cover 18 to verify that the secret number is the number which was supplied by the owner, thus verifying that the check is being cashed by the correct owner. However, if any unauthorized person has temporarily removed the cover 18 in order to determine what the secret number 16 is, and then has subsequently reattached the cover 18, even the brief exposure of the stub of the check will cause the photo-sensitive material to "develop" and will thus cause the word VOID to become visible. Thus, when the teller removes the cover in the course of the check-cashing procedure, if the word VOID appears on the stub, he knows that the holder of the check is not the correct owner and he impounds the check without paying it out.

After initially cashing the check, the bank teller removes the end stub portion 12 by tearing it off at the perforation 14 so that subsequent processing of the check can be carried out by punched card reading and sorting machines without any interference by reason of the possible mechanical deformations of the end stub 12 or because of remnants of the cover strip materials on the stub. Thus, the main body of the card 10 remains in excellent condition, without any modifications which interfere with machine processing.

As an additional precaution, in accordance with the present invention, the secret alphanumeric designation 16 may be printed by means of a material which is visible only in the presence of ultra-violet light. For instance, fluorescent materials are capable of becoming fluorescent and thus visible in the presence of ultra-violet light whereas they remain invisible under ordinary illumination. Thus, the bank teller may be equipped with an ultra-violet lamp so that he can place the document under the ultra-violet lamp to make the secret alphanumeric designation visible for verification. The light-sensitive material in which the word VOID is printed is preferably highly reactive to ultra-violet light so that the material is quickly visible once it is exposed to ultra-violet light. Thus, any unauthorized person who places the document under ultra-violet light to learn the secret designation will cause the word VOID to appear almost immediately. Silver bromide is such a photosensitive material.

While the invention has been described here in terms of imprinting a pattern spelling the word VIOD in the light-sensitive material, it is obvious that various other patterns can be provided as alternatives to an imprint of that word. Thus, some form of fanciful pattern or design may be applied over the entire area covered by the strip 18.

The light-senstive material has been briefly described above as a silver halide. All of the halides of silver, including silver iodide, silver fluoride, silver chloride, and silver bromide are usable for this purpose. However, silver bromide is preferred.

It is apparent from the drawing that the individual sections of the strip 18 containing the separate imprints of the word VOID do not coincide exactly in length with the length of the end stub 12. This illustrates one of the preferred arrangements in which it is unnecessary to have an exact registration between the operation of the imprinting roller 22 and the position of the document end stub 12. Thus, the individual sections containing the imprints of the word VOID are short enough so that there is always a complete section on the stub 12 with completely random registration of the roller 22 with the stub 12.

While the continuous strips 18 and 20 are preferred, it is quite apparent that with appropriate arrangements for registration, precut limited length individual labels or cover patches may be applied to the two sides of the stub 12. This has a number of advantages, including elimination of the problem of trimming the strips after they are applied. It is also apparent that the rollers 22 and 24 may have built-in cutting dies which trim the strips to the desired length as they are being applied.

Another modification which is not illustrated in the drawing, but which is quite effective, is to provide the mailing envelope for the check or payment document in an opaque material, at least in the portion which covers the end stub portion 12, and to provide the micro-encapsulated photo-sensitive material on the inner surface of that portion of the envelope. The document, in the mailing envelope, is then run through the rollers 22 and 24 in order to provide the imprint of the word VOID in the manner previously described.

While the stub 12 is illustrated at the right end of the payment document 10, it is quite apparent that other designs may be employed. For instance, the stub 12 may be provided at the left end of the payment document instead of at the right end. This is advantageous if the document is to be processed by indexing the position of the document at the right marginal edge after the stub is removed.

The use of the invention has been described in terms of bank checks. However, it is apparent that the invention is applicable to other instruments such as bank drafts, U.S. Treasury checks, and other negotiable instruments, as well as various ownership instruments such as stock certificates and registered bond certificates. Thus, the term payment order, as used in this patent application, is intended to include documents other than bank checks for which payment is to be received.

The verification of documents has been described as carried out by a bank teller. However, the verifying agent obviously may be someone other than a bank teller.

The document in accordance with the present invention has been described above entirely in terms of a machine-readable punched card. The invention is particularly useful with documents in that form. However, it is quite apparent that the invention is also useful with documents in other forms and is not necessarily limited to punched card documents.

While this invention has been shown and described in connection with particular preferred embodiments, various other alterations and modifications will occur to those skilled in the art. Accordingly, the following claims are intended to define the valid scope of this invention over the prior art, and to cover all changes and modifications falling within the true spirit and valid scope of this invention.

I claim:

1. A method for protecting a payment order or similar instruments against collection by unauthorized persons comprising the steps of placing on a portion of said payment order a secret code designation known only to the correct payee, covering said secret code designation with a light impervious cover having a light-sensitive material micro-encapsulated in the surface thereof adjacent to the surface of said payment order, said material becoming irreversibly developed upon exposure to light, and exerting pressure in a pattern on the combination of said cover and said payment order to cause the micro-encapsulated light-sensitive material to be released from said cover and to be adhered to the adjacent surface of said payment order in the localized areas of the pattern of pressure so that whenever said cover is removed to expose said light-sensitive material said pattern of pressure soon becomes visible to thereby make premature removal detectable.

2. The method as claimed in claim 1 wherein said payment order is a bank check.

3. The method as claimed in claim 1 wherein said payment order is a machine-readable punched card.

4. The method as claimed in claim 3 wherein the portion of said payment order containing the secret code designation is a perforated stub which can be removed after the step of original collection by the original payee in order to promote ease of subsequent machine processing of the payment order.

5. A method as claimed in claim 1 wherein said secret code designation is affixed to the payment order by means of a printing material which is visible only in ultra-violet light and said micro-encapsulated light-sensitive material is highly reactive to ultra-violet light so as to become visible in ordinary light rapidly after exposure to ultra-violet light.

6. A payment order document in the form of a machine-readable punched card including a detachable end-stub portion, a secret code designation printed on the front face of said end-stub portion, a cover means which is substantially light impervious covering both sides of said end-stub portion, at least the portion of said cover means covering said front face of said end-stub portion including micro-encapsulated light-sensitive material in the surface thereof adjacent to said front face of said end-stub portion, said material becoming irreversibly developed upon exposure to light, at least some of said micro-encapsulated light-sensitive material having been released and adhered to said face of said end-stub portion in a distinctive pattern by externally applied pressure after said cover means is in place so that said distinctive pattern becomes visible by exposure to light as soon as said cover means is removed.

7. A payment order document as claimed in claim 6 wherein said microencapsulated light-sensitive material is comprised of a light-sensitive silver halide material.

8. A document as claimed in claim 7 wherein said silver halide is silver bromide.

9. A document as claimed in claim 6 wherein said cover means comprises an envelope completely enclosing said document.

10. A document as claimed in claim 6 wherein said cover means comprises a strip of sheet material having the edges thereof securely adherent to said end stub portion.

11. A document as claimed in claim 10 wherein said edges of said strip are adhered to said end stub portion by mechanical embossing.

12. A document as claimed in claim 10 wherein said edges of said cover strip are adhered to said end-stub portion by an adhesive.

13. A document as claimed in claim 10 wherein said cover means is comprised of a polymeric organic resin including an opaque material.

* * * * *